(12) United States Patent
Li

(10) Patent No.: US 8,339,479 B2
(45) Date of Patent: *Dec. 25, 2012

(54) IMAGE CAPTURING DEVICE AND IMAGE SYNTHESIS METHOD THEREOF

(75) Inventor: Yun-Chin Li, Taipei County (TW)

(73) Assignee: Altek Corporation, Hsinchu (TW)

( * ) Notice: Subject to any disclaimer, the term of this patent is extended or adjusted under 35 U.S.C. 154(b) by 110 days.

This patent is subject to a terminal disclaimer.

(21) Appl. No.: 13/018,041

(22) Filed: Jan. 31, 2011

(65) Prior Publication Data

US 2012/0127348 A1 May 24, 2012

(30) Foreign Application Priority Data

Nov. 22, 2010 (TW) .............................. 99140241 A

(51) Int. Cl.
*H04N 5/262* (2006.01)
*H04N 5/235* (2006.01)
(52) U.S. Cl. ...................... 348/239; 348/229.1; 348/362
(58) Field of Classification Search ............. 348/207.99, 348/222.1, 229.1, 234, 239, 254–256, 350, 348/362–366
See application file for complete search history.

(56) References Cited

U.S. PATENT DOCUMENTS

| 2001/0007473 | A1* | 7/2001 | Chuang et al. ................. 348/362 |
| 2004/0207734 | A1* | 10/2004 | Horiuchi ..................... 348/229.1 |
| 2007/0292048 | A1* | 12/2007 | Choe et al. ..................... 382/286 |
| 2009/0015690 | A1* | 1/2009 | Yamashita ................. 348/229.1 |
| 2012/0120263 | A1* | 5/2012 | Li et al. ....................... 348/208.4 |

* cited by examiner

*Primary Examiner* — Tuan Ho
*Assistant Examiner* — Zhenzhen Wu
(74) *Attorney, Agent, or Firm* — WPAT, P.C.; Anthony King

(57) ABSTRACT

An image capturing device and an image synthesis method thereof are disclosed. The image capturing device includes an image capturing module, an exposure module, and a processing module. The image capturing module captures a scene image corresponding to a scene. The exposure module meters the light of scene to generate a plurality of histograms. The processing module calculates a plurality of discrete values of the scene image in different exposure conditions according to the histograms. Further, based upon at least two highest discrete values, the processing module processes the scene image to generate at least two temporary images in at least two different brightness conditions, and synthesizes the temporary images to generate a high dynamic range image.

9 Claims, 6 Drawing Sheets

IMAGE CAPTURING DEVICE AND IMAGE SYNTHESIS METHOD THEREOF

BACKGROUND OF THE INVENTION

1. Field of the Invention

This invention relates to an image capturing device and image synthesis method thereof and particularly to an image capturing device and image synthesis method thereof that may analyze a shot scene on multiple sorts of exposure brightness to further synthesize a high dynamic range image.

2. Description of the Related Art

A high dynamic range (HDR) file is a graphics file of special format, and each pixel of the file contains normal RGB information and real brightness information. However, each pixel in a normal graphics file is defined to have a gray scale ranged only from 0 to 255, which is actually not enough because the gray scale or brightness range between the light-emitting strength and a real black object is far beyond 256 levels. Thus, when a normal daytime landscape picture are displayed, the white cloud area and the sun area might be shown in the same gray scale/brightness, but the white cloud and the sun actually might be quite different in brightness. Accordingly, the normal graphics file format is not very definite since no real conditions are kept.

The high dynamic range indicates a contrast ratio of a brightest portion to a darkest portion in a scene. In a high dynamic range image, a brightness value of real scene that is fairly beyond 256 levels is recorded, in which a portion beyond the levels is not shown in the display. It is possibly regarded that a picture shot out of a window inside, which is opened in Photoshop, shows an over exposed portion outside the window and the portion stays all white without any details. Dimming cannot solve everything because it brings merely gray and does not show more details. If the same scene is recorded from the high dynamic range image, decreasing the exposure degree makes the pure white portion show more details.

Currently, a synthesized high dynamic range image is mostly made for a scene with a fixed exposure value from several images, in which each image is poor slightly at exposure compensation of 1 or 2 exposure values (EV) or lower, which is tried to combine many different exposed images for the dynamic image regarding the scene. However, in the existing method, the dynamic state of each image is limited, so multiple images must be taken for synthesis; a general camera is limited in processing capability and thus if more than three images cannot be handled in a short time, a few images must be selected for synthesis. For example, 2 or 3 images are processed and constant exposure compensation is used to capture 2 or 3 images for the synthesis of high dynamic range images. However, in this way, sometimes owing to the scene, an appropriate value of exposure compensation cannot effectively selected to capture or handle the images, and thus a desired high dynamic range image often cannot be produced. Therefore, for the demand, designing a perfect image capturing device and image synthesis method to synthesize high dynamic range images has become an urgent issue for the market application.

SUMMARY OF THE INVENTION

An image capturing device and image synthesis method thereof according to this invention is provided to solve the above-mentioned defects of prior art of synthesis of different exposed compensated image that causes unexpected high dynamic range image processing time and unexpected image quality.

The image capturing device according to this invention comprises an image capturing module, an exposure module, and a processing module. The image capturing module captures a scene image corresponding to a scene. The exposure module meters the light of scene to generate a plurality of histograms. The processing module calculates a plurality of discrete values of the scene image in different exposure conditions according to the histograms. Further, based upon at least two highest discrete values, the processing module processes the scene image to generate at least two temporary images in at least two different brightness conditions, and synthesizes the at least two temporary images to generate a storage image.

Preferably, the exposure module meters the light of scene with a plurality of exposure compensation conditions to generate the histograms in different exposure conditions.

Preferably, the exposure module generates the histograms in different exposure conditions in an interval range of brightness.

Preferably, each of the discrete values indicates the degree of variation between the brightness and darkness of the scene image in the different exposure compensation conditions.

Preferably, the processing module synthesizes all pixels of the same image object in the two temporary images in different brightness conditions to generate the storage image.

Further, an image synthesis method according to this invention is disclosed, being applied to the image capturing device. The image synthesis method comprises the following steps. First, the image capturing module is used to capture the scene image from a scene. The exposure module is used to meter the light of scene for generating a plurality of histograms. Then the processing module is used to calculate a plurality of discrete values of the scene image in different exposure conditions according to the histograms. Based upon at least two highest discrete values, the scene image is processed by the processing module for generating at least two temporary images in at least two different brightness conditions. The at least two temporary images are synthesized by the processing module in different brightness conditions for generating the storage image.

In this method, the exposure module preferably further meters the light of scene with a plurality of exposure compensation conditions to generate the histograms in different exposure conditions.

In this method, the exposure module preferably further generates the histograms in different exposure conditions in an interval range of brightness.

In this method, the processing module preferably further synthesizes all pixels of the same image object in the two temporary images in the different brightness conditions to generate the storage image.

Preferably, each of the discrete values indicates the degree of variation between the brightness and darkness of the scene image in the different exposure compensation conditions.

Further, the image synthesis method according to this invention is disclosed, being applied to the image capturing device. The image synthesis method comprises the following steps. First, the image capturing module is used to capture the scene image from the scene. The exposure module is used to meter the light of scene by means of a plurality of exposure compensation conditions for generating a plurality of histograms in different exposure conditions. The processing module is used to calculate a plurality of discrete values of the scene image in different exposure conditions according to the histograms. Based upon at least two highest discrete values, the scene image is processed by the processing module for generating at least two temporary images in at least two different brightness conditions. The at least two temporary images are synthesized by the processing module in different brightness conditions for generating the high dynamic range image.

Preferably, each of the discrete values indicates the degree of variation between the brightness and darkness of the scene image in the different exposure compensation conditions.

Preferably, the storage image is a high dynamic range images.

The image capturing device and image synthesis method thereof according to this invention have one or more advantages, as follows:

1. The image capturing device and image synthesis method thereof may, during filming, analyze the dynamic state of brightness when the light of scene ready for shooting is metered. Then, according to the amount of image that may be processed by the image capturing device, the temporary images of different exposure values are generated dynamically and efficiently for synthesis of a high dynamic range image. Thus, the time of synthesis of the high dynamic range image may be shortened.
2. The image capturing device and image synthesis method thereof may, during filming, analyze the dynamic state of brightness when the light of scene ready for shooting is metered. Then, according to the amount of image that may be processed by the image capturing device, the temporary images of different exposure values are generated dynamically and efficiently for synthesis of a high dynamic range image. Thus, the quality of synthesis of the high dynamic range image may be increased.

DETAILED DESCRIPTION OF THE PREFERRED EMBODIMENTS

Figure 1:
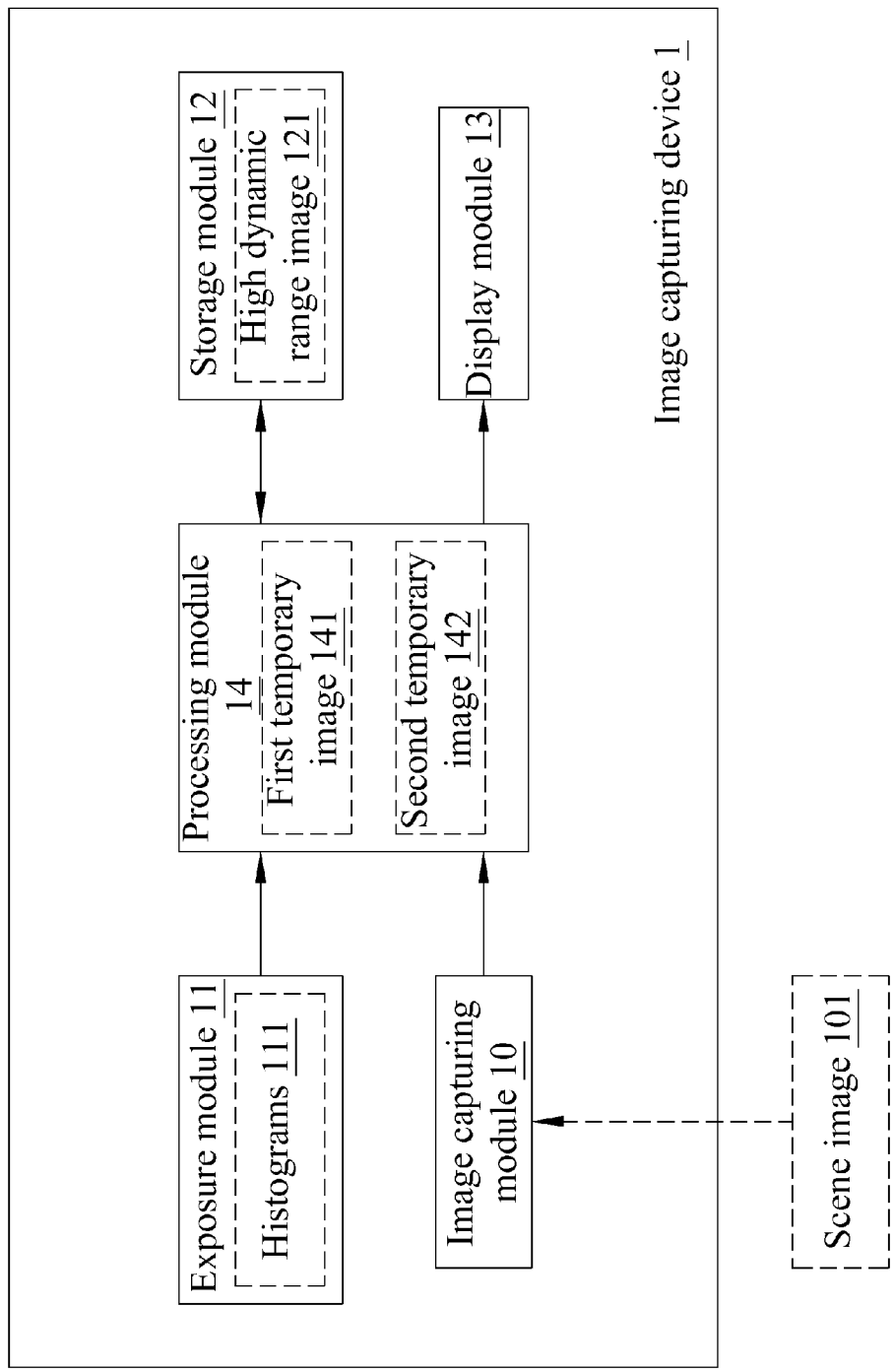
FIG. 1 is a block diagram in an embodiment of an image capturing device according to this invention

In order to further know the features and technical means of this invention, refer to the detailed description an image capturing device and image synthesis method thereof below according to this invention accompanied with drawings; however, the accompanied drawings are provided for reference and illustration only and are not limited to this invention. The present invention will be described in detail by way of a preferred embodiment with reference to accompanying drawings, in which like reference numerals are used to identify the same or similar parts.

The image capturing device according to this invention may be a digital camera, a camera phone, a smart phone, or a digital video camera and the like as a portable electronic device having an image pickup function. In order to further know the features and technical means of this invention, refer to the following embodiments illustrating the camera phone, not remaining within the confines of what is required herein.

Refer to FIG. 1 as a block diagram in an embodiment of an image capturing device according to this invention. As shown in the figure, the image capturing device 1 according to this invention comprises an image capturing module 10, an exposure module 11, a storage module 12, a display module 13, and a processing module 14. The image capturing module 10 is used to capture an image and generate image data. The image capturing module 10 may comprise a lens, a Complementary Metal-Oxide-Semiconductor (CMOS) or a Charge-Coupled-Device (CCD), an analog/digital circuit, an image processor and the like. The exposure module 11 is provided with an auto exposure adjustment mechanism, which may comprise aperture, shutter, ISO sensibility and the like, and meters the light of scene with a plurality of exposure compensation conditions to generate the histograms 111 in different exposure conditions. The storage module 12 may work for image storage and may be an embedded memory, an external memory card or their combination. The display module 13 is used to show an image and may be a Liquid Crystal Display (LCD) or a touch-controlled LCD.

The processing module 14 is electrically connected to the image capturing module 10, the exposure module 11, the storage module 12, and the display module 13, and may be a central processing unit (CPU) or a micro-processing unit. The processing module 14 may calculate a plurality of discrete values of the scene image 101 in different exposure conditions according to the histograms 111 generated by the exposure module 11. Further, based upon at least two highest discrete values, the processing module 14 processes the image to generate at least two temporary images in at least two different brightness conditions. For example, as shown in FIG. 1, the processing module 14 may process the scene image 101 to generate a first temporary image 141 and a second temporary image 142. Then, the processing module 14 may synthesize the temporary images, such as the first temporary image 141 and the second temporary image 142, in at least two different brightness conditions to generate a high dynamic range image 121 that will be stored in the storage module 12. The processing module 14 may control the display module 13 for showing the high dynamic range image 121.

Figure 2:
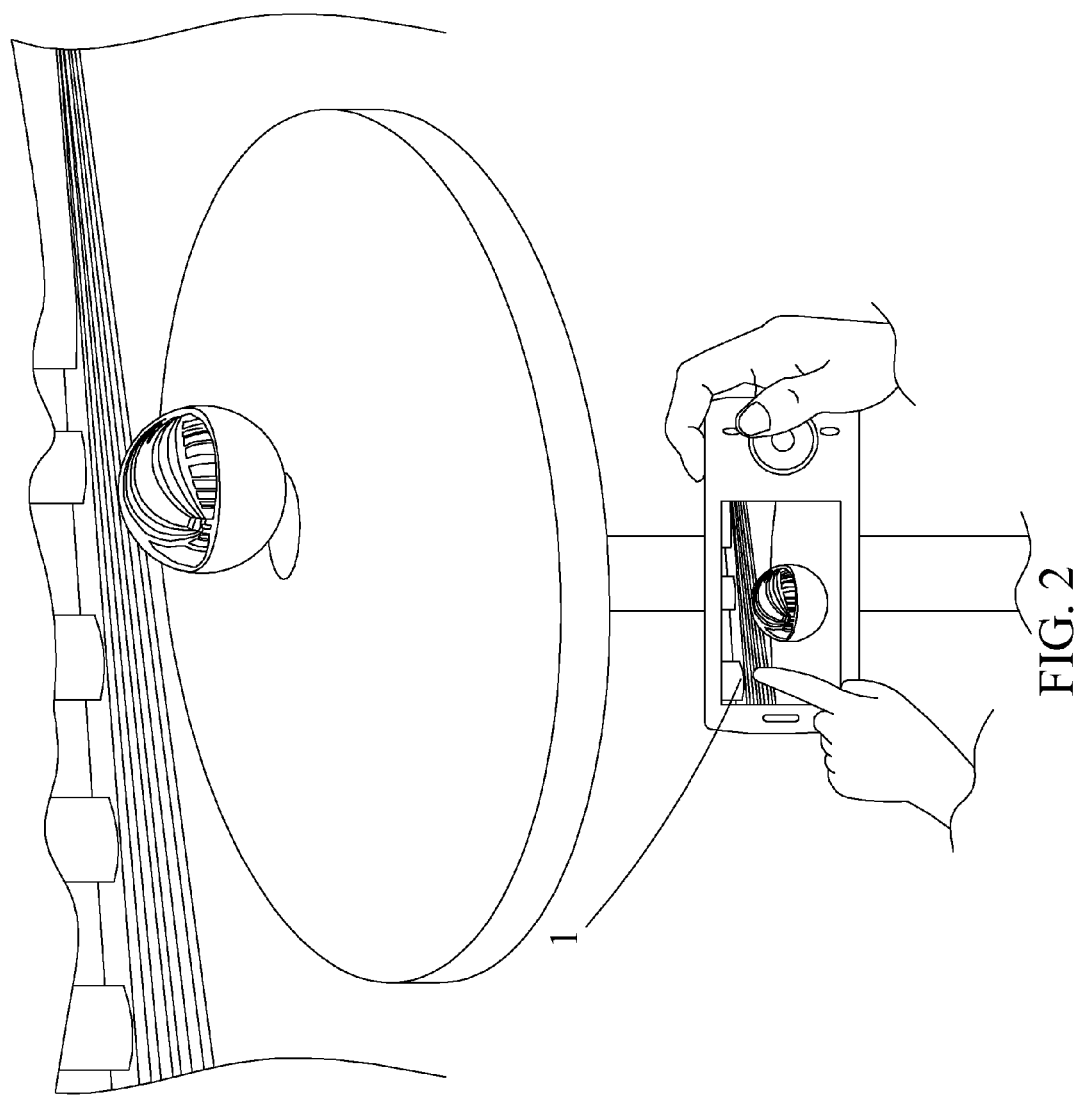
FIG. 2 is a schematic view illustrating an embodiment of the image capturing device according to this invention.
Figure 3:
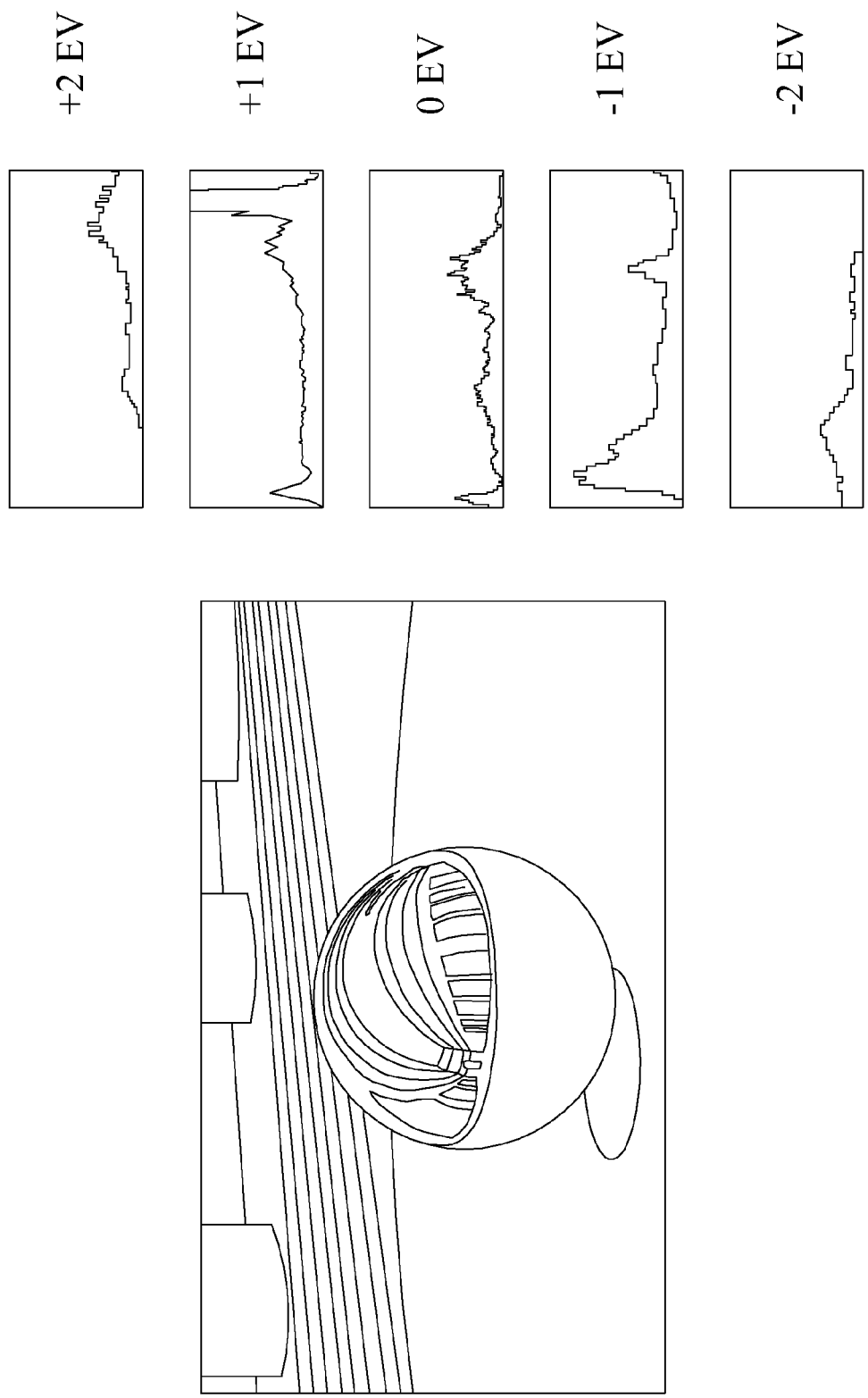
FIG. 3 is a schematic view illustrating each of the histograms of an image in an embodiment of the image capturing device according to this invention.

Refer to FIG. 2 as a schematic view illustrating an embodiment of the image capturing device according to this invention. As shown in the figure, when using the image capturing device 1 to capture the scene image 101 through the image capturing module 10, a user may meter the light of scene by means of an auto exposure (AE) mechanism of the exposure module 11 for gathering statistics from the histograms 111 of shot scene in different exposure conditions. In the embodiment, when the exposure module 11 works for metering the light in the auto exposure adjustment mechanism, 5 exposure compensation conditions, +2 EV, +1 EV, 0 EV, −1 EV, and −2 EV, may be separately used for metering the light. Thus, when the image capturing module 10 captures the scene image 101, the exposure module 11 may obtain each of the histograms 111 in different exposure conditions, as shown in FIG. 3. Next, the processing module 14 may calculate the entropy of scene image 101 in a specified exposure compensation condition through each of the histograms 111. A higher entropy indicates a wider valid dynamic range of the scene image 101 in the specified exposure compensation condition, namely, a wider range of variation between brightness and darkness.

Figure 4:
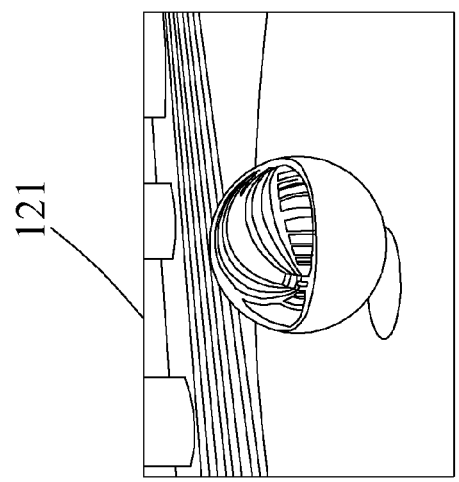
FIG. 4 is a schematic view illustrating a high dynamic range image synthesis in an embodiment of the image capturing device according to this invention.
Figure 4:
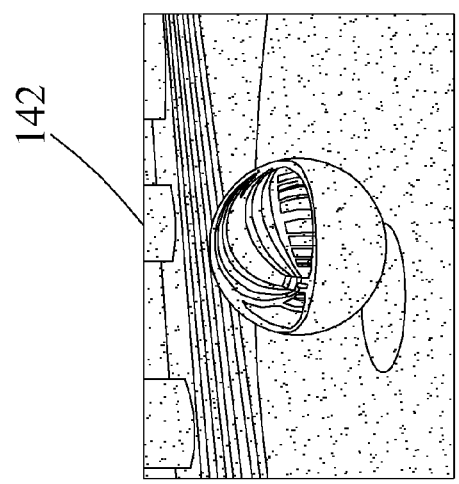
Figure 4:
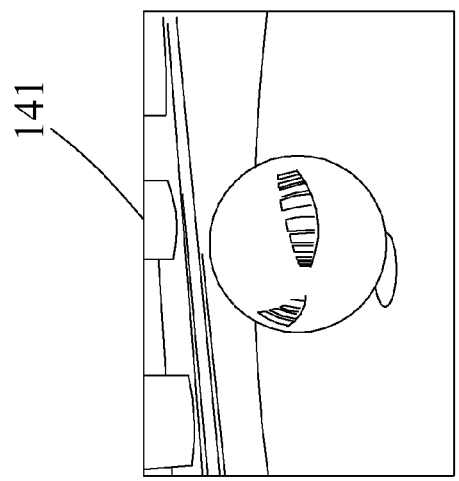

With reference to table 1, pairs of data of the different exposure compensation value corresponding to the entropies are given. As shown in the table, it is apparent that the entropies in the 5 units of exposure compensation conditions, +2 EV, +1 EV, 0 EV, −1 EV, and −2 EV, are 3.31, 4.01, 3.75, 3.83, and 2.96, respectively. From the description made above, it may be further deduced that the data in the valid dynamic range of scene image 101 in the specified exposure compensation condition are +1 EV, −1 EV, 0 EV, +2 EV, and −2 EV in descending order. Thus, the processing module 14 may process the scene images 101 according to the processing time or synthesis frame for the high dynamic range images initially set by the image capturing device 1, in which the initial settings may be dynamically adjusted to different pieces by a manufacturer or user. For example, there are two temporary images for the synthesized high dynamic range images that are initially set; in the embodiment of this invention, the amount of synthesized images is not limited; the processing module 14 may process the scene image 101 captured by the image capturing module 10. Based on the sizes of entropies in 5 exposure compensation conditions, a first temporary image 141 of +1 EV and a second temporary image 142 of −1 EV are generated. Next, as shown in FIG. 4, the processing module 14 may synthesize the first temporary image 141 of +1 EV and the second temporary image 142 of −1 EV to generate a high dynamic range image 121 that will be stored in the storage module 12. Finally, the display module 13 may show the high dynamic range image 121.

TABLE 1

Different sets of exposure compensation corresponding to different entropies.

| Exposure Compensation | Entropy |
| --- | --- |
| +2 | 3.31 |
| +1 | 4.01 |
| 0 | 3.75 |
| −1 | 3.83 |
| −2 | 2.96 |

From the description made above, when there are two temporary images for the synthesized high dynamic range images that are initially set, the processing module 14 processes the image by means of exposure compensation with highest combined entropies to generate the first temporary image 141 of +1 EV and the second temporary image 142 of −1 EV, which indicates the highest valid dynamic range of scene image 101 in the exposure compensation condition. Next, the processing module 14 synthesizes all pixels of the same image object in the first temporary image 141 and second temporary image 142 that are formed in different brightness conditions to obtain the high dynamic range image in the maximum dynamic range. Namely, in a limited shooting condition, an optimum exposure parameter may be selected to synthesize the high dynamic range images, in which the dynamic state and its details are the best.

It is nevertheless especially noted that the image capturing device 1 may also process the scene image 101 in an expected brightness range of interval. As described above, if being interested in the information on the brightness level ranging from 64 to 192, the user may control the processing module 14 through an operation interface (not shown) for gathering statistics from the histograms 111 in the range to locate an optimum pair of exposure. Next, the processing module 14 processes and forms the scene image 101 into temporary images 141 and 142 in at least two different brightness conditions to synthesize the high dynamic images. Finally, a high dynamic range image 121 in a range of brightness between 64 and 192 is generated.

Besides, in this invention, it is apparent to those who are skilled in the art that when the auto exposure adjustment mechanism is used to meter the light, the digit unit "1" is not necessary for light metering for exposure compensation and the digit unit "0.3" or another digit unit as an interval may also be used to meter the light for exposure compensation in the auto exposure adjustment mechanism. Further, another discrete value or statistic may stand for the entropy of image in the specified exposure compensation condition. What is described above is an only example without limit to this invention.

Figure 5:
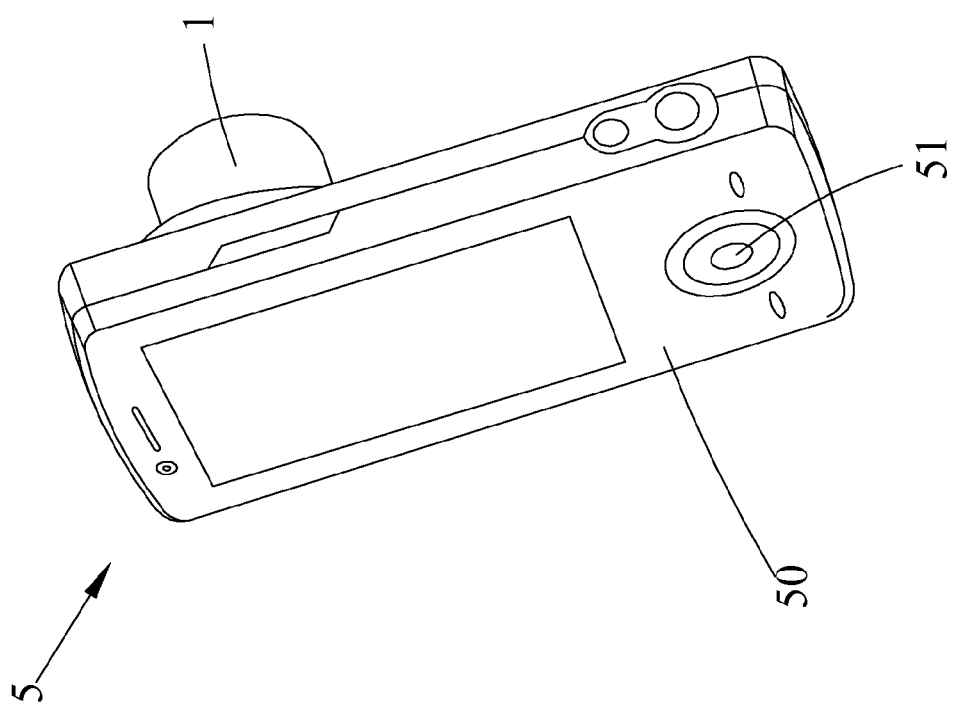
FIG. 5 is a schematic view illustrating an embodiment of an electronic device with the image capturing function according to this invention.

Refer to FIG. 5 as a schematic view illustrating an embodiment of an electronic device with the image capturing function according to this invention. As shown in the figure, the electronic device 5 according to this invention comprises a body 50, an input means 51, and the image capturing device 1. The image capturing device 1 is provided on the body 50 and is electrically connected to the input means 51. The image capturing device 1 comprises the image capturing module, the exposure module, the storage module, the display module, and the processing module. The image capturing device 1 is described in detail above, so redundant details are not given here. It is nevertheless especially noted that the electronic device 5 according to this invention may be a mobile handheld device, such as a digital camera, a multimedia playback device with a camera function, a camera mobile phone, a smart phone, a navigator, a camera tablet PC or PDA and the like.

In the embodiment, the electronic device 5 according to this invention provided, for example, in a smart phone, may be embedded into the image capturing device 1 according to this invention to function as a camera. Thus, the user may use the input means 51 of smart phone, such as a touch panel or a hardware button, to make the electronic device 5 meter the light with AE, calculate the entropy, and synthesize the high dynamic range images in the condition of high dynamic range image ready for shooting, which significantly reduces the time of synthesis of the high dynamic range image and increases the quality of synthesis of the high dynamic range image. The smart phone disclosed in this invention is an only example without limit to this invention; those who are skilled in the art may easily replace the device with another device for operating with the image capturing device according to this invention.

Although the image capturing device according to this invention is described above and the method of synthesizing the images captured by the device is described, for the details, a flow chart is described in detail below.

Figure 6:
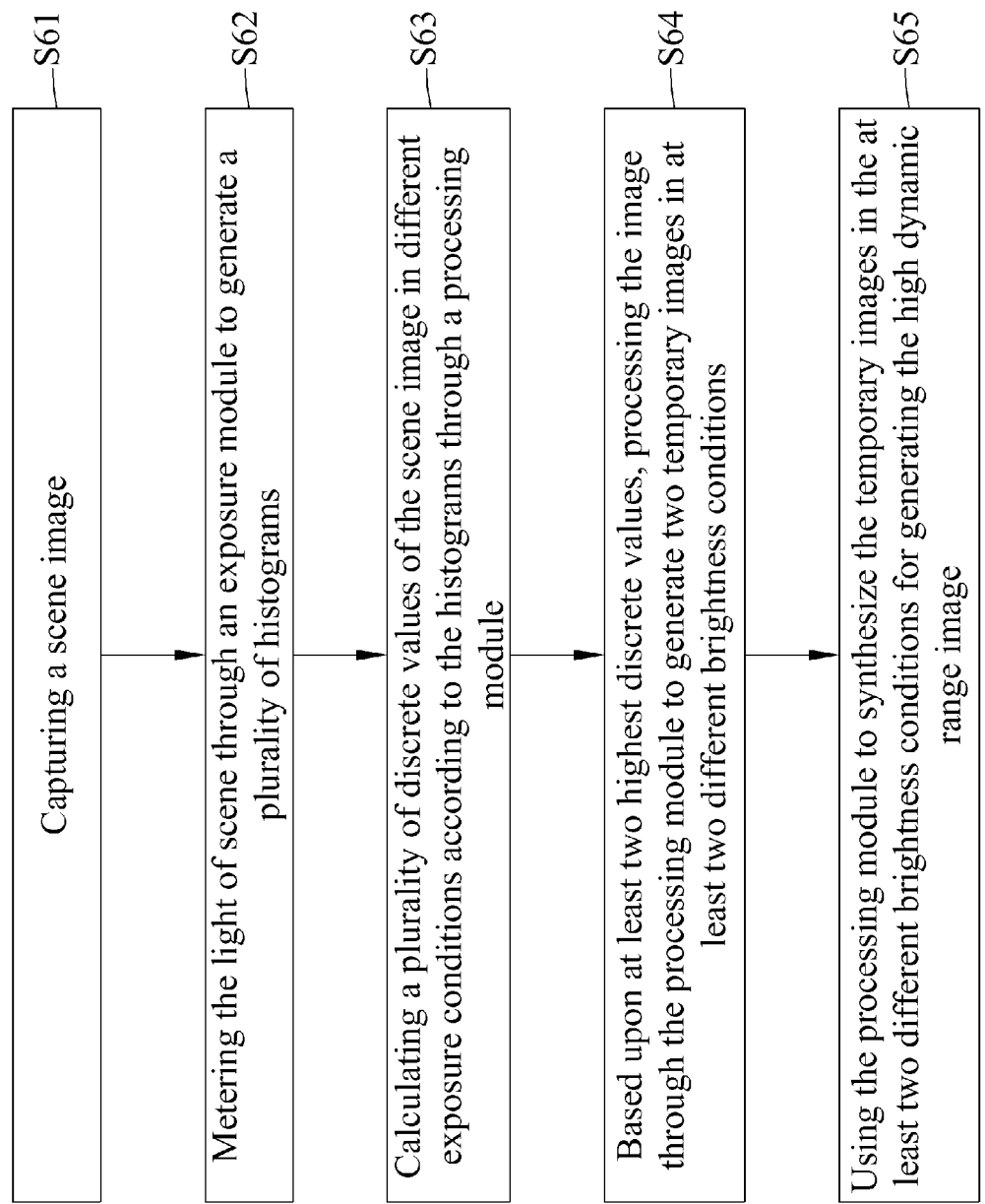
FIG. 6 is a flow chart of an image synthesis method according to this invention.

Refer to FIG. 6 as a flow chart of an image synthesis method according to this invention. As show in the chart, the image synthesis method according to this invention is applied to the image capturing device. The image capturing device comprises the image capturing module, the exposure module, the storage module, the display module, and the processing module. The method of synthesizing the images captured by the image capturing device comprises the following steps of:

(S61) capturing a scene image corresponding to a scene through the image capturing module;

(S62) metering the light of scene with a plurality of exposure compensation conditions through the exposure module to generate a plurality of histograms in different exposure conditions;

(S63) calculates a plurality of discrete values of the scene image in different exposure conditions according to the histograms through the processing module;

(S64) based upon at least two highest discrete values, processing the scene image through the processing module to generate two temporary images in at least two different brightness conditions; and (S65) using the processing module to synthesize the two temporary images in the at least two different brightness conditions for generating the high dynamic range image.

The detailed description and embodiments of image synthesis method for the image capturing device according to this invention are given above, and so redundant details are not given here To sum up, being disclosed in this invention, the image capturing device and image synthesis method thereof may, during filming, analyze the dynamic state of brightness when the light of scene ready for shooting is metered. Then, according to the amount of image that may be processed by the image capturing device, the temporary images of different exposure values are generated dynamically and efficiently for synthesis of a high dynamic range image. Thus, the time of synthesis of the high dynamic range image may be shortened and the quality of synthesis of the high dynamic range image may be increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capturing device, comprising:
    an image capturing module, capturing and then generating a scene digital image corresponding to a scene;
    an exposure module, metering a light of scene to generate a plurality of histograms; and
    a processing module, calculating a plurality of discrete values of the scene digital image in different exposure conditions according to the histograms, based upon at least two highest discrete values of the plurality of discrete values, the processing module processing the scene digital image to generate at least two temporary digital images in at least two different brightness conditions, and synthesizing the two temporary digital images to generate a storage image;
    wherein the exposure module meters the light of scene with a plurality of exposure compensation values to generate the histograms in the different exposure conditions.

2. The image capturing device according to claim 1, wherein the exposure module generates the histograms in the different exposure conditions in an interval range of brightness.

3. The image capturing device according to claim 1, wherein each of the plurality of discrete values indicates a degree of variation between brightness and darkness of the scene digital image in one of the exposure compensation conditions.

4. The image capturing device according to claim 1, wherein the processing module synthesizes all pixels of the same image object in the two temporary digital images in the two different brightness conditions to generate the storage image.

5. An image synthesis method, being applied to the image capturing device and comprising the following steps of:
    capturing and then generating a scene digital image corresponding to a scene through an image capturing module;
    metering a light of scene through the exposure module to generate a plurality of histograms;
    calculating a plurality of discrete values of the scene digital image in different exposure conditions according to the histograms through a processing module;
    processing the scene digital image through the processing module to generate at least two temporary digital images in at least two different brightness conditions based upon at least two highest discrete values of the plurality of discrete values; and
    using the processing module to synthesize the two temporary digital images in the at least two different brightness conditions for generating a storage image;
    wherein the exposure module meters the light of the scene based on a plurality of exposure values to generate the plurality of histograms in different exposure conditions.

6. The image synthesis method according to claim 5, further comprising the following step of using the exposure module to generate the histograms in the different exposure conditions in an interval range of brightness.

7. The image synthesis method according to claim 5, further comprising the following step of synthesizing all pixels of the same image object in the two temporary digital images in the two different brightness conditions through the processing module to generate the storage image.

8. An image synthesis method, being applied to the image capturing device and comprising the following steps of:
    capturing and then generating a scene digital image corresponding to a scene through an image capturing module;
    metering a light of scene with a plurality of exposure compensation conditions through an exposure module to generate a plurality of histograms in different exposure conditions;
    calculating a plurality of discrete values of the scene digital image in different exposure conditions according to the histograms through a processing module;
    based upon at least two highest discrete values of the plurality of discrete values, processing the scene digital image through the processing module to generate at least two temporary digital images in at least two different brightness conditions; and
    using the processing module to synthesize the two temporary digital images in the at least two different brightness conditions for generating the high dynamic range image;
    wherein the exposure module meters the light of the scene based on a plurality of exposure values to generate the plurality of histograms in different exposure conditions.

9. The image synthesis method according to claim 8, wherein each of the plurality of discrete values indicates a degree of variation between brightness and darkness of the scene digital image in one of the exposure compensation conditions.

* * * * *